United States Patent
Bordawekar et al.

(10) Patent No.: US 7,512,615 B2
(45) Date of Patent: Mar. 31, 2009

(54) SINGLE PASS WORKLOAD DIRECTED CLUSTERING OF XML DOCUMENTS

(75) Inventors: Rajesh Bordawekar, Yorktown Heights, NY (US); Sriram K. Padmanabhan, Briarcliff Manor, NY (US); Oded Shmueli, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/703,250

(22) Filed: Nov. 7, 2003

(65) Prior Publication Data

US 2005/0102256 A1    May 12, 2005

(51) Int. Cl.
G06F 7/00 (2006.01)
G06F 17/00 (2006.01)

(52) U.S. Cl. .................................................. 707/101
(58) Field of Classification Search ............... 707/1, 707/3, 6, 101
See application file for complete search history.

(56) References Cited

U.S. PATENT DOCUMENTS

| | | | |
|---|---|---|---|
| 5,448,727 A | 9/1995 | Annevelink | |
| 5,504,887 A | 4/1996 | Malhotra et al. | |
| 5,713,023 A | 1/1998 | Hayata et al. | |
| 5,940,832 A | 8/1999 | Hamada et al. | |
| 6,269,477 B1 | 7/2001 | Fitzgerald et al. | |
| 6,366,903 B1 | 4/2002 | Agrawal et al. | |
| 6,636,849 B1 * | 10/2003 | Tang et al. | 707/6 |
| 6,647,381 B1 * | 11/2003 | Li et al. | 707/3 |
| 2003/0004937 A1 * | 1/2003 | Salmenkaita et al. | 707/3 |
| 2004/0148278 A1 * | 7/2004 | Milo et al. | 707/3 |
| 2004/0216096 A1 * | 10/2004 | Messer et al. | 717/154 |
| 2007/0033515 A1 * | 2/2007 | Sull et al. | 715/500.1 |

OTHER PUBLICATIONS

Dyreson, et al., "MetaXPath," 2001.*
Lim, et al., "XPathLearner: An On-Line Self-Turning Markov Histogram for XML Path Selectivity Estimation" Aug. 2002, Proceedings of the 28$^{th}$ VLDB Conference.*
World Wide Web Consortium. W3C Architecture Domain. www.w3c.org/xml. Online Document.
D. Florescu and D. Kossmann. Storing and Querying XML Data using an RDBMS. IEEE Data Engineering Bulletin, 22(3):27-34, 1999.
G.N. Frederickson. Optimal Algorithms for Tree Partitioning. In Proceedings of the Second Annual ACM-SIAM Symposium on Discrete Algorithms, pp. 168-177, 1991.

(Continued)

Primary Examiner—Apu M Mofiz
Assistant Examiner—Brent Stace
(74) Attorney, Agent, or Firm—Ference & Associates LLC

(57) ABSTRACT

A method and system for clustering of XML documents is disclosed. The method operates under specified memory-use constraints. The system implements the method and scans an XML document, assigns edge-weights according to the application workload, and maps clusters of XML nodes to disk pages, all in a single parser-controlled pass over the XML data. Application workload information is used to generate XML clustering solutions that lead to substantial reduction in page faults for the workload under consideration. Several approaches for representing workload information are disclosed. For example, the workload may list the XPath operators invoked during the application along with their invocation frequencies. The application workload can be further refined by incorporating additional features such as query importance or query compilation costs. XML access patterns could be also modeled using stochastic approaches.

30 Claims, 9 Drawing Sheets

OTHER PUBLICATIONS

M.S. Garey and D. S. Johnson. Computers and Intractability. W.H. Freeman and Co., 1979.

M. Schkolnick. A Clustering Algorithm for Hiearchical Structures. ACM Transactions on Database Systems (TODS), 2(1):27-44,1977.

D.S. Johnson and K.A. Niemi. On Knapsacks, Partitions, and a New Dynamic Programming Technique for Trees. Mathematics of Operations Research, 8(1), 1983.

B.W. Kernighan. Optimal Sequential Partitions of Graphs. J. Assoc. Comp. Mach., 18(1):34-40, 1971.

J.A. Lukes. Combinatorial Solution for the Partioning of General Graphs. IBM Journal of Research and Development, 19(2):170-180, 1975.

J.A. Lukes. Efficient Algorithm for the Partioning of Trees. IBM Journal of Research and Development, 13(2):163-178, 1974.

C. Gerlhof, A. Kemper, C. Kilger, and G. Moerkotte. Partition-Based Clustering in Object Bases: From Theory to Practice. Proceedings of the Foundations of Data Organization and Algorithms, FODO'93, Chicago, Illinois, Oct. 13-15, pp. 301-316, 1993.

C. Kanne and G. Moerkotte. Efficient Storage of XML Data. Proceedings of the 16th International Conference on Data Engineering, San Diego, USA, Mar. 2000. IEEE Computer Society.

A.R. Schmidt, F. Waas, M.L. Kersten, D. Florescu, M.J. Carey, I. Manolescu, and R. Busse. Why and How to Benchmark XML Databases. ACM SIGMOD Record, 3(30), Sep. 2001.

F. Tian, D. DeWitt, J. Chen and C. Zhang. The Design and Performance Evaluation of Alternative XML Storage Strategies. ACM SIGMOD Record (31):1, pp. 5-10, ACM Press, 2002.

M.M. Tsangaris et al. A Stochastic Approach for Clustering in Object Bases. Proc. of the 1991 ACM SIGMOD Int'l Conf. on Mgmt. of Data. Denver, CO, May 29-31, pp. 12-21, ACM Press, 1991.

M.M. Tsangaris et al. On the Performance of Object Clustering Techniques. Proc. of 1992 ACM SIGMOD Int'l Conf on Mgmt of Data, San Diego, CA, Jun. 2-5, pp. 144-153, ACM Press, 1992.

* cited by examiner

SINGLE PASS WORKLOAD DIRECTED CLUSTERING OF XML DOCUMENTS

FIELD OF THE INVENTION

This invention generally relates to clustering of XML documents and, more specifically, to single pass workload directed clustering of XML documents.

BACKGROUND OF THE INVENTION

A list of references is set forth at the close of the present disclosure; individual references from the list are referred to with abbreviations in brackets (i.e., [FK99], [TN91], etc. . . . ).

Current database or repository systems use two main approaches for storing XML documents. The first approach maps an XML document to a relational table where each row represents an edge in the document's (abstract) XML tree [FK99]. XML processing on stored documents is implemented via existing relational operators. The second approach, Native XML Storage, views the document as an XML tree. It partitions the XML tree into distinct records containing disjoint connected subtrees [KM00]. Records are then stored in disk pages, either in an unparsed, textual form, or using some internal representation.

For database systems that support operators for navigating between data items via link (pointer) traversal, clustering of related data items is beneficial in physically laying data. Here, two nodes are related if they are connected via a link, and examining one of them is likely to soon lead to examining the other. For example, data clustering has been shown to be effective for hierarchical databases such as IBM's IMS [Sch77], and for object-oriented databases (OODBs) [TN91, TN92, GKKM93].

XML documents are often processed using query languages such as XSLT, XPath, or XQuery [WC3]. These languages use the XPath navigational operators for traversing paths of abstract XML trees. In native XML storage systems, this results in navigations across stored XML records that are similar to those in hierarchical or object-oriented databases. In practice, such traversals are often aided by path indexes that alleviate the number of path navigations across stored records. However, path indexes cannot completely eliminate such path traversals as XML query patterns are often complex and it is expensive to maintain multiple path indexes to cover the entire XML document. Furthermore, many processing schemes employ deferred access and may need additional traversals for revalidation as the data may have been updated. Finally, generic physical layout schemes can scatter XML nodes across many records. For such physical layouts, conventional I/O optimization techniques like prefetching or buffering may not be effective for complex XML queries. Therefore, it is beneficial, especially for large XML documents, to cluster together related XML nodes and store them in the same disk page.

As disk pages have finite capacity, not all related XML nodes can fit in a single disk page. Therefore, one needs to decide how to assign related XML nodes to disk pages. A key difference between clustering objects in OODBs and clustering related XML nodes is that in OODBs, size of an object is known a priori from its class specification, whereas for XML documents, in the absence of XML schema, node sizes are known after they are parsed. Even when an XML schema is available, sizes of text nodes are known only at runtime.

The problem of assigning related XML nodes to disk pages may be viewed as a tree partitioning problem. The tree to be partitioned is a clustering tree, namely an XML tree augmented with node and edge weights. Roughly, the edge weights model the XML navigational behavior (higher edge weights mean that the connected XML nodes are more strongly "related"). Node weights are the (text) sizes of the XML nodes. The problem is to partition the set of nodes of the clustering tree into node-disjoint subsets (called clusters) so that a cluster induces a connected subtree, each cluster fits into a disk page, and the total of the intra-cluster edges' weights (called the partition's value) is maximized. (Conversely, the total weight of the inter-cluster edges (the partition's cost is minimized.) Intuitively, a higher value partition implies fewer disk accesses.

A widely accepted approach to the tree partitioning problem has been Lukes' dynamic programming-based tree partitioning method [Luk74]. This method operates on a tree in a bottom-up manner and uses an iterative procedure that splits increasingly larger subtrees into a collection of partitions. Each partition is a set of non-disjoint clusters, each cluster satisfying the total weight constraint (i.e., disk page size). For each subtree, and for each feasible cluster weight, Lukes' method finds a partition with the maximum value. The method completes when the subtree being partitioned is the entire tree itself. The final winning partition is a partition of the entire tree with the maximum value. The method of Lukes, however, suffers from excessive memory and running time usage which are artifacts of dynamic programming. Thus, there is a need to improve upon Lukes' method.

SUMMARY OF THE INVENTION

In accordance with at least one presently preferred embodiment of the present invention, there is broadly contemplated a system and method for to single pass workload directed clustering of XML documents.

In summary, one aspect of the invention provides a system for clustering XML documents, the system comprising: an arrangement for parsing an XML document by node; an arrangement for initializing at least one parsed node; an arrangement for partitioning at least one parsed node; and an arrangement for processing at least one parsed node.

Another aspect of the present invention provides a system for clustering XML documents in a single pass, the system comprising: an arrangement for parsing an XML document by node; an arrangement for determining XPath work traversals of at least one parsed node; an arrangement for clustering at least one parsed node; and an arrangement for assigning at least one cluster to a page.

An additional aspect of the present invention provides a method for clustering XML documents, the method comprising the steps of: parsing an XML document by node; initializing at least one parsed node; partitioning at least one parsed node; and processing at least one parsed node.

Furthermore, an additional aspect of the invention provides a program storage device readable by machine, tangibly embodying a program of instructions executable by the machine to perform method steps for clustering XML documents, said method comprising the steps of: parsing an XML document by node; initializing at least one parsed node; partitioning at least one parsed node; and processing at least one parsed node.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
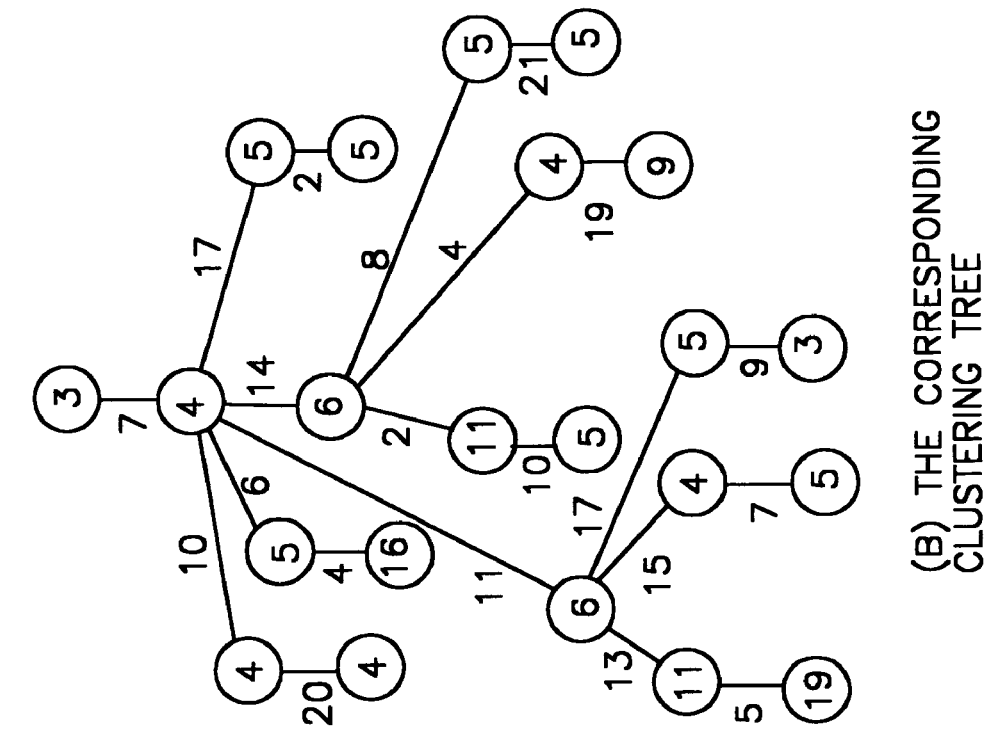
FIG. 1 shows an XML tree and the corresponding clustering tree.

One embodiment of the present invention is a tree partitioning method, XC, which is used for clustering large static XML documents. In another embodiment of the present invention, XC is preferably integrated in a system with a SAX parser and an edge-weight assigner (using explicit weights or deriving weights from a declarative workload specification), in which the workload is fixed. The system, on-the-fly, generates a clustering tree containing the completed nodes of the XML document. As described below, XC uses various techniques for retaining only those clusters and partitions that could be useful in the future and frees all remaining data structures as soon as possible.

The disclosure now turns to a discussion of the key features of XC. For the purpose of discussion, the simple XML tree illustrated in FIG. 1(a) will be used. FIG. 1(b) presents the corresponding clustering tree (with node and edge weights). The clustering tree is the XML tree augmented with node and edge weights, both of which are integers. Node weights are the (text) sizes of the XML nodes and edge weights model the importance of putting the nodes into the same cluster.

The method of the present invention is preferably used for partitioning medium to large size XML trees (Megabyte to Gigabyte). For large XML trees, most applications can only maintain portions of the XML tree in memory. Furthermore, XML documents are usually parsed in a single pass, in document order, in which each XML data node is scanned only once. This forces an implicit invocation order on XC. Unlike Luke's method, XC processes tree nodes in a bottom-up left-to-right order. For example, for the tree shown in FIG. 1(a), the method of the present invention processes nodes in the following node order: 3, 2, 5, 4, 8, 7, 10, 9, and so on. At any point during execution, XC maintains in memory only a fragment of the XML tree. That fragment is a subtree of the part of the XML document scanned thus far. XC has no information about the remaining, not yet scanned, part of the document. So, at every step, XC makes decisions solely based on the information gained from scanned XML nodes.

Like Lukes' method, XC also operates on a clustering tree. Once a subtree of the clustering tree is completely handled by XC, it is referred to as a processed subtree (and its root is referred to as a processed node). XC computes a set of partitions for a subtree, where each partition is a set of distinct clusters. Weight of a cluster is computed as a sum of the weights of its member nodes. The cluster containing the root of the partitioned subtree is called the pivot cluster and its weight is designed as the weight of the partition. Considering the sample XML tree of FIG. 1(a):

1. Node 3 (with data 12345) is the first one with a completely scanned subtree (containing itself). XC now invokes the leaf handling step of Lukes' method and initializes structures for node 3 (a leaf). Once processed, the subtree rooted at node 3 is transformed into a processed subtree containing only one node (node 3) and its associated partition containing a single cluster (3) with weight equals that of node 3.

2. Node 2 is the next one with a completely scanned subtree (containing itself and nodes 3). XC now executes the internal node handling step of Luke's method on the subtree's root node 2. Similarly to Lukes' method, the inner loop iterates over the children (there is only one, namely node 3) and generates intermediate partitions. Once processed, the subtree rooted at node 2 is transformed into a processed subtree containing only one node (node 2) and its associated partitions. It should be understood partitions are created in the present invention in accordance with generally known methods, i.e., merging and concatenation. See [Luk74] for a general discussion of partition creation by merging and concatenation.

The disclosure now turns to a discussion of dynamic programming using weight intervals. In processing a node with node weight $w \geq 1$, the method of Lukes' examines all possible partitions with weights from w to the weight bound, W. This results in $O(n W)$ space and $O(n W^2)$ time complexities. This is prohibitive for large XML files where values for n can be in the millions (of XML nodes) and W in the thousands (of bytes). To address this problem, the method of the present invention partitions the (1, W) weight range into equal size weight intervals and associates only one partition for each weight interval. The number of the weight intervals is specified by the application using the chunk_size parameter. The value of chunk_size (denoted by C) can vary from 1 to W and is a divisor of W. The associated partition of each weight interval has the maximum value among the considered partitions whose weights fall in that interval. So, for XC, following internal node processing of Lukes' method [Lu74], there are at most $W_c=W/C$ intermediate partitions associated with the node. Similarly, the inner loop iterates over the weight intervals from 1 to $W_c$. These modifications reduce the space complexity to $O(n W_c)$ and time complexity to $O(n W_c^2)$. This weight interval approximation technique is used only for placing intermediate partitions in the proper interval. The decision whether to merge clusters is still based on actual cluster weights (rather than the interval).

For example, when Lukes' method is invoked on the clustering subtree consisting of nodes 2 and 3, two intermediate partitions are created. The first, $p_4^2$, with weight 4 and value 0, is created by concatenating clusters containing nodes 2 and 3. The partition $p_9^2$, with weight 9 and value 20, is created by merging clusters containing nodes 2 and 3. If W=10 and chunk_size=10 then $W_c=1$ and both $p_4^2$ and $p_9^2$ fall in the single weight interval, so only the higher valued $p_9^2$ is retained. If W=10 and chunk_size=5 then $W_c=2$, and both partitions are retained. As in Lukes' method, once a subtree is processed, all the subtree root's children can be discarded (and memory freed).

It is instructive to examine the boundary cases C=1 and C=W. When chunk_size=1, the method of the present invention operates exactly as Lukes' method; it also finds an optimal partition. When chunk_size=W, only one intermediate partition is produced per each node. In other words, XC operates as a simple greedy algorithm. If possible, it simply merges its current partition's pivot cluster with that of the child, adds the other child clusters, and thereby produces a new (and more valuable partition). Otherwise, it simply unions the current partitions of the node and the child.

The disclosure now turns to a discussion of identification of ready clusters. In addition to weight intervals, XC also employs other strategies to limit its memory consumption. First, the basic data structures employed by XC to represent nodes, clusters and partitions, are designed so that as soon as a piece of logical data is no longer needed, its corresponding memory can be reclaimed. Second, XC removes XML text data from memory as soon as possible. The method of Lukes' retains possible result clusters until the final result partition is computed. Each XML node of a cluster carries with it the corresponding XML text. This leads to keeping the entire XML document, and more, in memory up till the time in which the final partition is computed. This is simply impractical. The present method addresses this problem by aggressively detecting ready clusters.

A cluster in a partition associated with a processed node x is ready if: (1) it does not contain node x and hence it cannot be involved in any future cluster merge operations, and (2) it is a member of every intermediate partition associated with node x, and so it will be a member of the final result partition. Ready clusters can be detected as soon as the subtree rooted at node x is processed. Ready clusters can then be removed from the intermediate partitions and forwarded (with their XML data) to the page assignment sub-system (see FIG. 2). Once the page assignment sub-system assigns a ready cluster (i.e., its XML data) to a page, the XML nodes, contained in the cluster, can be deleted along with their XML data. This can lead to significant reduction in memory utilization and subsequently, improve the running time. For example, clustering a 580 KB XML document without identifying ready clusters used 2.43 MB of memory and took 170 seconds. When ready clusters are identified, the same document may be clustered in 1.2 seconds and needs only 43 KB of memory. This underscores the crucial role of ready cluster identification.

The disclosure now turns to a discussion of handling memory constraints. In spite of the reduction techniques employed by the present invention, memory consumption can still be very large, particularly, for large XML documents and for smaller chunk_size values. Large memory consumption often increases the number of (virtual memory) page faults and hence degrades performance. Erratic paging behavior can make any method unfit for applications that operate under stringent time constraints, such as real-time data streaming applications. A method's applicability is restricted where it can run only when there is substantial available memory. The method of the present invention, XC, is designed as a single-pass (streaming data) XML application that operates under specified time and memory constraints. The chunk_size parameter controls the number of iterations and also influences memory consumption. Still, XC should be able to operate under explicitly specified memory consumption limits.

The technique employed to enable the basic method of the present invention to work effectively subject to a memory limit will now be described. This technique extends the idea of ready clusters to ready sub-partitions. Ready clusters are clusters that would be part of the final computed partition. A ready sub-partition is the highest value partition that is associated with the root of an already processed subtree (of the clustering tree) which is a subset of the computed best approximate partition for the whole clustering tree. If one could identify a ready sub-partition, then the sub-partition's clusters can be forwarded to the page assignment sub-system and the memory of associated data structures such as the XML nodes, their text, and clusters could be reclaimed immediately. The elimination of partitions also reduces the number of options for future dynamic programming considerations; further reducing the memory usage.

In general, it is difficult to identify a ready sub-partition at a processed node x (a sufficient condition is that in all the partitions associated with x, the pivot cluster has weight W). Instead, when memory limits are approached, it is presently preferred to simply declare some sub-partitions as ready (as discussed below). This approach sharply reduces memory consumption. However, this approach has a drawback; it affects accuracy since there may be some clusters in a ready sub-partition that could have been used in future cluster merge operations (which in turn would have increased the value of the final partition). Therefore, it is important to choose ready partitions such that the final result quality (i.e., value) is not significantly affected.

Once a subtree is processed, its intermediate partitions are retained until its parent node is processed. For example, for the XML tree presented in FIG. 1(a), intermediate partitions for nodes 7, 9, and 11 are retained until the subtree rooted at node 6 is processed. In accordance with the present invention, a bounded-length (a parameter k, e.g., k=8) list, HL, of the current up to k highest value partitions that are associated with processed nodes (i.e., roots of processed subtrees whose parents are not yet processed) is maintained. This partition list contains only the optimal partitions such that the sum of the values of the optimal partitions is always maximum. Given a memory limit M, the method of the present invention computes high and low "water marks" for managing memory usage (low<high<M). When memory usage crosses the high water mark, corrective actions are triggered; once memory usage reaches the low water mark, normal operation resumes.

Upon crossing the high water mark, XC, the method of the present invention, chooses a partition, P, with the highest value from HL. XC then marks this partition as a ready sub-partition, forwards its clusters to the page assignment sub-system, and then reclaims the memory of the associated data structures. P will also form a subset of the final result partition. XC then removes the XML node $v_P$ with which P is associated (i.e., a root of a processed subtree) and discards $v_P$'s link to its parent. This process of eliminating highest value partitions from HL continues until either the memory usage falls below the low water mark or the optimal partition list is empty. If the memory-usage violation persists and the optimal partition list is empty, then, as soon as any subtree is processed, its optimal partition is immediately marked as ready and is eliminated, in the process described above.

The behavior of the method of the present invention during a memory-usage violation will now be discussed with reference to FIG. 1(a). Assume that the memory usage crosses the high water mark while processing text node 15 (INRIA). At this point, three subtrees rooted at nodes 2, 4, and 6 are already processed, and their highest value partitions are stored in HL. Now consider the corresponding clustering tree FIG. 1(b). Assume that the highest value partition for node 6 has the highest value in HL, followed by the one for node 2, and then the one for node 4. In this case, first the highest value partition (associated with node 6) is chosen as a ready partition and node 6 is deleted and is no longer a child of node 1. If the memory-usage violation persists, the highest value partition (associated with node 2) is the next one to be declared as ready. Assuming that by now the memory-usage falls below the low water mark, XC resumes normal operation (that is until the next high water mark crossing, partitions of the processed subtrees are retained, and used, as in the method of Lukes during processing).

The heuristic strategy, i.e., marking a partition P in HL with the highest value as a ready sub-partition, attempts to minimize a possible loss in value due to the early elimination of partitions (associated with $v_P$). The declaration of a ready sub-partition is made without any knowledge of the structure and size of the yet-to-be scanned XML nodes. The heuristic to always choose highest value partitions as ready partitions is a way to address this uncertainty.

Figure 2:
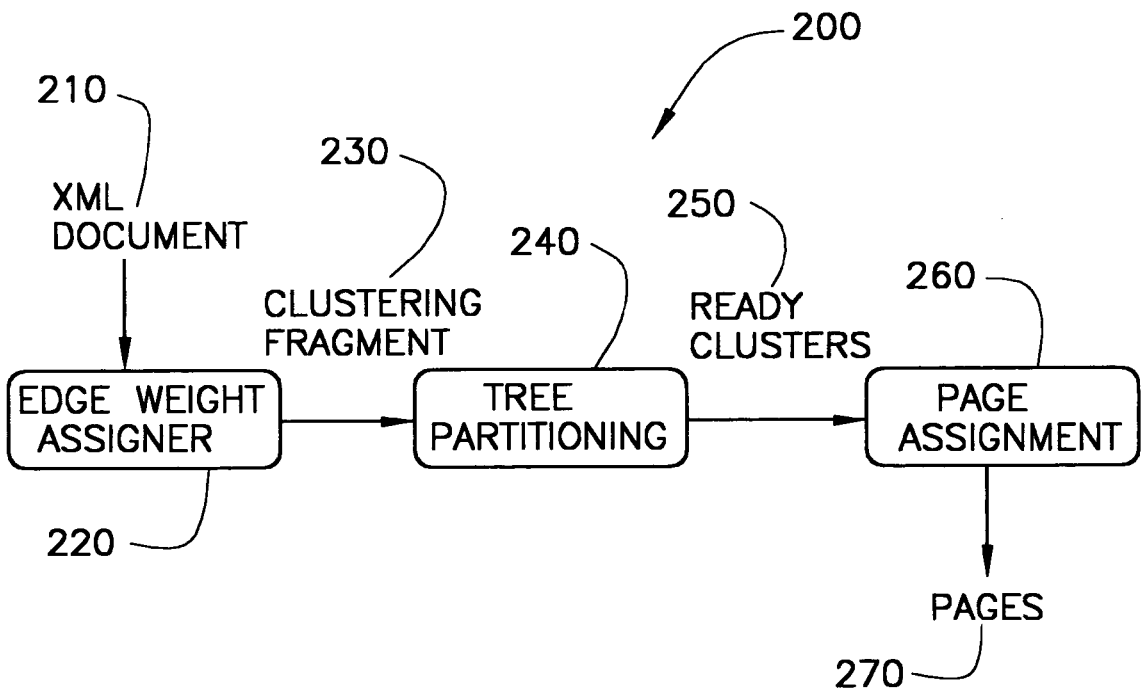
FIG. 2 shows a block diagram of a generic XML clustering system in accordance with the present invention.

The disclosure now turns to a discussion of an XML clustering system in accordance with the present invention. FIG. 2 illustrates the architecture of an XML clustering system 200 that scans an XML document, partitions it into clusters and assigns the clusters to (disk) pages, all within a single pass. It consists of three distinct sub-systems: edge-weight assigner 220, tree partitioning 240 and disk page assignment 260. The inter-sub-systems edges in the figure (210, 230, 250, and 270) denote procedure calls. The application workload information that is used by the edge-weight assigner, can in general be of different forms (e.g., statistics).

In accordance with the present invention, an XML clustering system, XCS, was implemented in accordance with this architecture in which XC is preferably used as the tree partitioning sub-system. The C++ version of the Apache Xerces SAX parser is preferably used (see http://xml.apache.org/xerces2-j/index.html), although any appropriate parser may be used. (The scenario in which XML documents are fed to the SAX parser in a streaming manner was considered.) The XML clustering system is a single SAX application in which different functional components are invoked by different SAX events. The parser scans each XML node only once and creates an in-memory data structure representation of that node. This in-memory data structure stores the text size of the XML node and acts as a node of the clustering tree. The edge leading to that node is then passed to the edge-weight assigner.

Edge-weight assigner 220 uses application workload information to assign weights to the clustering tree edges. In XCS's edge-weight assigner, the workload information consists of a list of XPath queries. Additional information such as the frequency or importance of specific XPath queries may also be provided. The workload information may also contain approximations of the actual queries; for example, a parameterized query may be approximated with one accessing all instances.

Edge-weight assigner 220 preferably uses a simulator that mimics the executions, of a naive streaming XPath processor, for the XPath queries in the workload (this simulator can be replaced by any streaming XPath processor). Currently, the simulator supports the following types of XPath queries:
1. Simple path queries, starting from the document root.
2. XPath Descendent-or-self ("//") queries.
3. Queries with positional and path predicates.

Additionally, the simulator mimics executions that use a path index on a query's sub-path. The simulator is invoked by appropriate SAX events. The simulator identifies the XML nodes that would be traversed by the naive Xpath processor during its actual execution. To this end, the simulator uses a deterministic automaton that transitions among states, while traversing an XML link, depending on the target node content. Depending on (1) relative importance/frequency of the XPath query, (2) the axis used in the XPath query, and (3) the plan of execution (i.e., with or without using a path index), the corresponding clustering tree edge is assigned a weight increment. The overall weight awarded to a clustering tree edge is the sum of the weight increments due to each workload query.

Intuitively, the assigned weight models the fact that the nodes connected by that edge are traversed in (temporal) succession by the naive XPath processor, and using that edge. The higher is the edge weight, higher is the traversal affinity between the connected nodes. This affinity stems from being traversed often and/or by "important" workload queries. Edge weight assigner 220 could be extended to capture behavior of more complex workloads, e.g., Xpath expressions involving path joins or complex predicates, XQuery queries, and XSLT templates. Irrespective of the type of the XML workload and the plan of execution (i.e., indexed or non-indexed), all XML queries finally get translated into traversals over edges of the abstract XML tree. Edge weight assigner 220 can use the edge traversal information and frequency/importance of the high-level queries to assign appropriate edge weights.

The execution of edge-weight assigner 220 will now be illustrated with reference to the XML tree shown in FIG. 1 and an application workload consisting of three XPath queries and their relative weights.

1. /bib/book/price 20
2. /bib/book/author/affiliation 50
3. /bib/book/author[2]/last} 30

All edges traversed by the query workload would be assigned edge weights reflecting actual executions.

Assuming that traversals performed during the actual executions of workload XPath queries would be performed without using any path indexes, the relative weights of the XPath queries are used to compute the contributions of queries to edge weights. For example, the edges traversed by the first workload query are assigned weight increments of 20, the edges traversed by the second query are assigned weight increments of 50, and the edges traversed by the third query are assigned weight increments of 30. If an edge is traversed by more than one workload query, its edge weight represents cumulative weights. For example, the edge (0,1) connecting nodes bib and book is traversed by all three XPath queries. Hence, it would be assigned the cumulative weight 100. Similarly, the edge (1,13) connecting the second author node with the book node is traversed by the second and the third XPath queries. Hence, this edge would be assigned weight 80. Finally, the edge (1, 20) is traversed by only one workload query, namely /bib/book/price, and is assigned weight 20.

Now consider the case when a path index is used for solving some workload queries. For example, consider an index on the path /bib/book/author. Here, the two edges connecting bib and book nodes are assigned weight 0 (jumped over). The edge (0,1) connecting nodes bib and book would be now traversed only by the first query, and is assigned weight 20.

Once the edge-weight assigner 220 assigns the edge weight, the clustering tree memory-resident portion is handled by the tree partitioning sub-system 240 (XC in this case). The tree partitioning sub-system is invoked either on the endElement( ) or character( ) SAX event or at the end of scanning an XML attribute. Thus, the XML clustering system follows a bottom-up left-to-right invocation order. The tree partitioning sub-system always operates on a clustering sub-tree (of height 1) with the just completed XML element, or attribute, as its root. XC, depending on the chunk_size, first computes different partitions for the subtree and then detects if these partitions contain any ready clusters. Ready clusters are removed from the computed partitions and forwarded to the page assignment sub-system 260. In any case, the generated partitions are retained for a future invocation of the method of the present invention.

To illustrate the invocation of the tree partitioning sub-system 240, consider the XML tree presented in FIG. 1. The tree partitioning sub-system 240 would be invoked first on node 3, then on node 2. Once the subtree rooted at node 2 is partitioned, the in-memory representation of node 3 is freed. The partitions computed for the subtree rooted at 2 are retained until node 2 is again used in a partitioning process as child of node 1. This process of partitioning a subtree rooted at x, freeing the children of x, detecting ready clusters and retaining partitions continues until x is the root and entire tree gets partitioned.

Page assignment sub-system 260 assigns ready clusters to pages. It is invoked as soon as a ready cluster is detected. Page assignment sub-system 260 preferably maintains a sorted list of ready clusters in decreasing order of their weights. Page assignment sub-system 260 preferably uses an online bin-packing algorithm that makes page assignment decisions solely on the basis of weights of the currently available ready clusters. It operates as follows:

1. As soon as the total size of the currently stored ready clusters crosses a limit (a parameter), the heaviest cluster is chosen and is assigned to a page.

2. This page is filled using additional smaller clusters, tried in decreasing weight order, until either the page size limit is reached or all pending clusters are examined.

3. The filled page is sent to disk, the memory of data structures related to its assigned clusters is reclaimed.

This process repeats until all ready clusters are mapped to disk pages. Note that once document scanning is complete, the page-assignment sub-system is activated to map all remaining memory-resident ready clusters to disk pages.

The disclosure now turns to a discussion of experimental results obtained utilizing the present invention. Several XML documents from the University of Washington XML repository (www dot cs dot washington dot edu backslash research backslash xmldatasets) were used to evaluate the method of the present invention. The system in accordance with the present invention, which utilizes the method, was then evaluated versus DCS (Depth-first Clustering System), which uses DFS (Depth-First Storage). DFS is a natural clustering algorithm that parses an XML document in depth-first manner. See Tian et al., The Design and Performance Evaluation of Alternative XML Storage Strategies, Association for Computing Machinery SIGMOD Record, 31(1) (March 2002), for a general discussion of DFS. In a greedy fashion, it produces XML nodes, ready to be stored into disk pages as soon as their scanning is completed. DFS completely ignores edge weights. The major advantage of DFS is that it places together XML nodes whose processing completes in temporal closeness. In both cases, the number of page faults during XPath query execution is used as the main metric of performance.

A key difference between the method of the present invention and Lukes' method is that the present invention uses dynamic programming over weight intervals rather than over the entire weight range. In accordance with the present invention, the weight interval is determined by the chunk_size parameter (that determines the number of dynamic programming intervals). Table 1 illustrates the effects of the chunk_size parameter. In this experiment, an XML file, mondial.xml of size 1.97 MB, and containing 154855 XML nodes, is clustered with a weight bound, W=4 KB. Clustering tree edges are randomly assigned weights. As illustrated in Table 1, as chunk_size decreases, the value of the final solution increases. As chunk_size decreases, the number of weight intervals used (for the dynamic programming) increases and XC becomes more precise. Concurrently, this causes increased memory usage and increased running time. When the chunk_size was 1, XC behaved like the exact Lukes' method, and the required running time was more than 2 hours (the application was terminated after 2 hours).

TABLE 1

Effect of Dynamic Programming Over Weight Intervals Using mondial.xml

| chunk_size (bytes) | Value | Memory Usage (bytes) | Time (ms) |
| --- | --- | --- | --- |
| 4096 | 838820 | 1425850 | 32511 |
| 2048 | 8388400 | 1561348 | 46887 |
| 1024 | 8392400 | 1774127 | 79617 |
| 512 | 8403500 | 2119727 | 138967 |
| 256 | 8419300 | 2902770 | 299933 |

The difference in solution values for the chunk_sizes of 4096 and 256, is not significant. It should be noted, however, that the running time increases from 32.5 seconds to 299.9 seconds. This indicates that the strategy of retaining a single partition per processed node (implied by 4096), namely the one with the highest value, works well in practice. As the results demonstrate, XC with chunk_size of 1 (equivalently, Lukes' method), exhibits unrealistic memory and runtime requirements; for larger chunk_sizes, XC obtains good solutions with reasonable memory and runtime usage.

TABLE 2

Evaluating Memory-Constrained Execution Using mondial.xml

| Memory Limits (bytes) | Memory Usage (bytes) | Value | Time (ms) |
| --- | --- | --- | --- |
| ∞ | 1425850 | 8388200 | 32511 |
| 1000000 | 900576 | 8353100 | 37305 |
| 500000 | 452095 | 8207900 | 32070 |
| 250000 | 226689 | 8203600 | 27943 |
| 100000 | 91264 | 8138600 | 17794 |
| 50000 | 47247 | 7996000 | 13164 |
| 30000 | 25815 | 7817300 | 9049 |

Table 2 presents the behavior of XC under varying specified memory usage limits. The memory-constrained behavior of XC was evaluated reusing the experimental setup of the previous experiment (same document, same weight bound). The experiment was first run using chunk_size of 4096 and without any memory limits. The experiment was then repeated with smaller memory limits (the amount of available memory was varied from 1 MB to 30 KB). The results demonstrate that XC performs well under even constraints. Furthermore, as the amount of available memory is reduced, XC degrades gracefully (values of the resultant partitions for the two extreme cases only differ from the best approximate solution by 6%). With tighter memory limits, execution time drops from 32.5 seconds to 9.049 seconds. These two experiments show that in using larger chunk_sizes and lower memory limits, it is possible to quickly get good solutions.

The impact of identifying ready clusters on the quality of results was also measured. As discussed above, when ready clusters are not identified, clustering uses a large amount of memory and significantly more execution time is needed. mondial.xml was clustered without identifying ready clusters. As the expected memory usage was significant, a memory limit of 200 KB was imposed. The experiment was rerun with ready cluster identification and the same memory limit. The value of final clustering drops by 20% when ready cluster identification was not used. When ready clusters are not identified, XC's memory consumption reaches the memory limit fairly quickly and only smaller subtrees get processed before reaching a memory violation. Therefore, only clusters with smaller values are forwarded to the page assignment sub-system; reducing the value of the final result.

Figure 3:
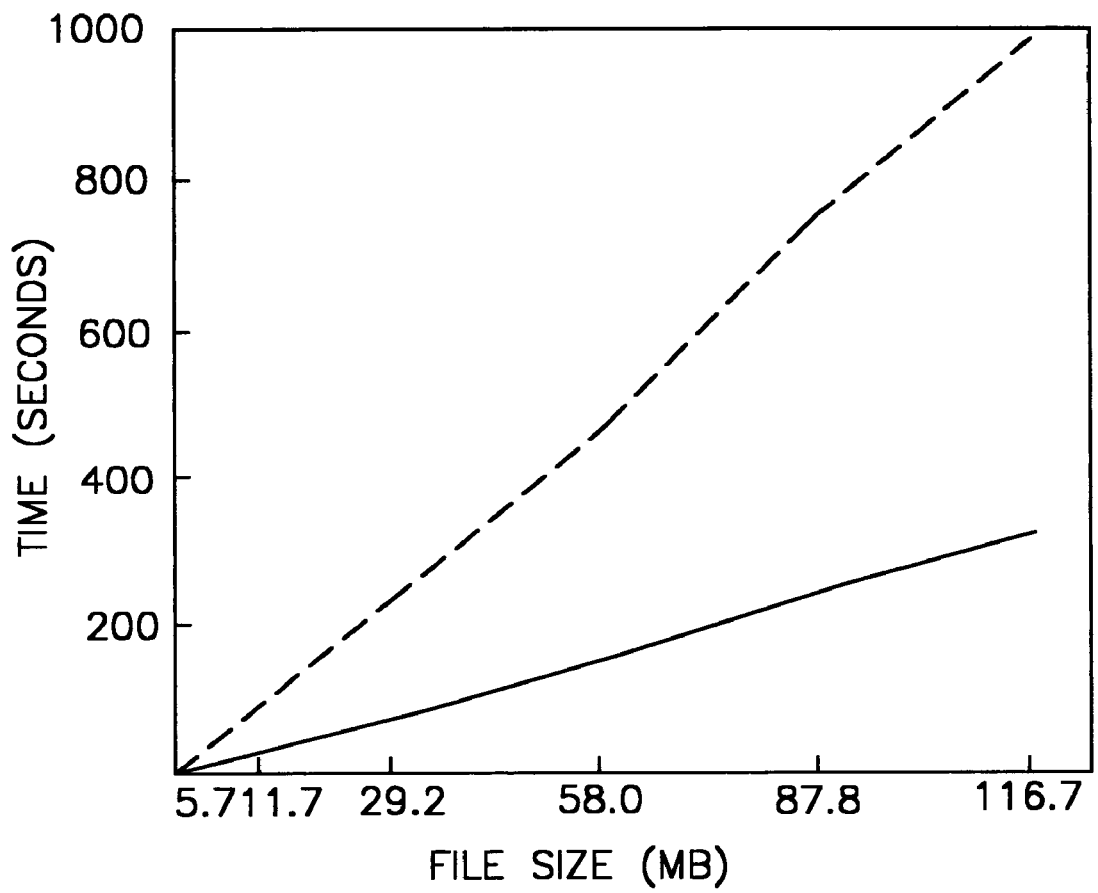
FIG. 3 graphically shows the nearly linear behavior of the present invention.

FIG. 3 presents the behavior of XC as the size of the XML file is increased (which, in this case, implies that the number of input XML nodes is also increased). For this experiment, the XMark XML document generation toolkit [SWK+01] was used to generate XMark documents of various sizes (26 KB to 116 MB). Edge weights were assigned depending on the types of the connected nodes. An element-element edge was assigned weight 3, an element-attribute edge was assigned weight 5, and an element-text edge was assigned weight 9. Each xmark document was clustered using a weight bound of W=4 KB and chunk_sizes of 4 KB and 1 KB. For clarity, FIG. 3 presents running times for XMark documents of sizes that vary from 1 MB to 110 MB. As FIG. 3 illustrates, the run time of the method of the present invention is nearly linear in the size of the file.

TABLE 3

Value Comparison of DFS and XC

| File Name | Value | | Time (ms) | |
|---|---|---|---|---|
| Bytes (node count) | DFS | XC | DFS | XC |
| Xmark.xml 1161615 (36971) | 198287 | 211939 | 1605 | 2365 |
| Mondial.xml 1970539 (154885) | 969946 | 993988 | 11164 | 22687 |
| SigmodRecord.xml 478416 (27740) | 160392 | 163603 | 2930 | 2820 |
| Uwm.xml 2337522 (108224) | 556128 | 567444 | 6558 | 6779 |
| Orders.xml 5378845 (285064) | 1600047 | 1623266 | 15131 | 18864 |
| Partsupp.xml 2241868 (88036) | 470310 | 481895 | 3490 | 6544 |

The effectiveness of XC was next compared with that of DFS, another tree partitioning method. Table 3 presents results of clustering six different XML documents using XC and DFS. Edge weights were assigned based on connected nodes types, in a manner identical to that of the experiment of FIG. 3. It should be noted that this configuration is biased against XC as there is no differentiating workload information. A weight bound of 4 KB was used, and XC was executed with a chunk_size of 4 KB and with infinite memory. As indicated in Table 3, for all documents, XC generated better clustering. However, in many cases, the time required by XC was greater than the time used by DFS. Even in the most beneficial configuration (weight bound equals chunk_size), XC performs more work than DFS and uses more memory. This causes XC to be slower than DFS.

TABLE 4

Partitioning with Workload-Based Edge Weights
(XML document - mondial.xml)

| chunk_size (bytes) | Value | Memory Usage (bytes) | Time (ms) |
|---|---|---|---|
| DFS | | | |
| 4096 | 279000 | 132081 | 11782 |
| XC | | | |
| 4096 | 410500 | 228124 | 15233 |
| 1024 | 412800 | 242144 | 17608 |
| 512 | 415600 | 273148 | 21124 |
| 256 | 423700 | 342582 | 30640 |
| 128 | 423800 | 478546 | 53818 |

The previous experiment used random weights. When the expected query workload is known, the uniformity of random assignments no longer holds. Clustering results were next obtained based on workload-based edge weight assignment. The following a single XPath query on mondial.xml:/mondial/country/province/city was used. Execution of this query was by a naive XPath processor. The edges of the XML tree that would be traversed during such an execution were assigned weight 100. The document was then partitioned by DFS and XC using various chunk_sizes. The results are illustrated in Table 4. A clear advantage for XC over DFS can be seen in terms of partition values. In practice, this kind of "skewed" edge weight assignment is expected to be the prevalent case.

The disclosure now turns to a discussion of evaluating the clustering system of the present invention, including use on large workloads. While the previous experiments illustrate XC's usefulness as a clustering algorithm which produces high value partitions in reasonable space and time, the usefulness of the resulting clustering for applications is now investigated. To this end, how the resulting page contents affect query processing was tested. The testing was performed in the context of the prototype clustering systems described above. XML documents were partitioned using two embodiments of the system: the first, XCS, uses XC as the tree partitioning component and the second, D, uses DFS for tree partitioning.

TABLE 5

Evaluating the Online Bin-Packing Method

| XML Document | DFS | XC | |
|---|---|---|---|
| (# nodes) | # pages | # clusters | # pages |
| Xmark.xml | 242 | 768 | 252 |
| Mondial.xml | 266 | 4237 | 269 |
| SigmodRecord.xml | 70 | 649 | 74 |
| Uwm.xml | 263 | 2040 | 272 |
| Orders.xml | 815 | 13978 | 833 |
| Partsupp.xml | 399 | 7407 | 405 |

The first component of the XML clustering system of the present invention to be evaluated is page-assignment component 260. Table 5 compares the number of disk pages needed to store six XML documents when clustered using XCS and DCS, which stores XML nodes into a pages as soon as the node's scanning is completed. DCS retains up to two incomplete pages in memory and uses a greedy strategy to fill the pages (with the completed XML nodes). This greedy strategy uses only the XML node size to maximize disk utilization. XCS stores the ready clusters using an online bin-packing method as previously discussed. Table 5 shows the number of ready clusters and the corresponding number of pages generated by XCS. As Table 5 illustrates, DFS (in DCS) induces a slightly better disk page utilization (around 5%) than XC. One reason for this may be that XC tends to store larger "chunks" of data than DFS. This causes fragmentation, leading to slightly lower page utilization.

How clustering affects the performance of XML query execution is now examined. For this purpose, the following query workload on mondial.xml, consisting of three XPath queries, was considered:

(Q1)/mondial/country/province/city
(Q2)/mondial/country/enthicgroups
(Q3)/mondial/country/province/city/name Each query was assigned the same weight (100). Queries Q2 and Q3 are executed using path indices on /mondial/country and /mondial/country/province, respectively (i.e., only the edges traversed from the indexed node are assigned non-zero edge-weights). An XC clustering (XC) of mondial.xml was generated using the specified workload. Based on this workload, XCS's edge-weight assigner assigned appropriate weights while scanning the document. The page assignment sub-system 260 mapped the ready clusters 250 to pages 270 using the bin-packing heuristic. Three other clusterings, $XC_i$, based respectively on three workloads, each consisting of a single query $Q_i$, $1 \leq i \leq 3$. While using XC, the weight bound of 4 KB and a chunk_size of 4 KB were also used. Finally, the document was partitioned using the simpler DFS algorithm (in DCS) with the same weight bound, producing the clustering, DFS.

The execution of each query by a naive XPath processor was simulated on the various layouts (XC, $XC_i$, and DFS) under three different paging scenarios and the page faults were measured. The experiment was repeated for the combined query workload in two modes: (1) serial: This scenario simulated execution of the three queries in the serial order (i.e., Q2Q1Q3), and (2) concurrent: This scenario simulated the execution of the three queries in a concurrent manner. The combined query workloads were evaluated for two layouts, XC and DFS.

For these experiments, traces of XML nodes traversed while executing the XPath queries were generated. These traces, along with the page layouts for different clusterings, were used for evaluating the paging behavior. Two important parameters were modified to vary the paging scenarios. The first, buffer size is the number of disk pages that can be held in memory. The second, prefetch quantity, is the number of contiguous disk pages that are fetched in a single disk access (starting at the page addressed and including consecutive pages). The first scenario used a buffer size of 1 page with a 1 page prefetch (denoted by 1/1); the second scenario considered infinite buffer size (i.e., a fetched page is retained in memory for the duration of the execution) and 1 page prefetch (denoted by Inf/1); the final scenario simulated a realistic situation of using a buffer with 128 pages with an 8 page prefetch (denoted by 128/8). This scenario used a simple LRU scheme for discarding in-memory pages. In all cases, a page size of 4 KB was assumed.

Figure 4:
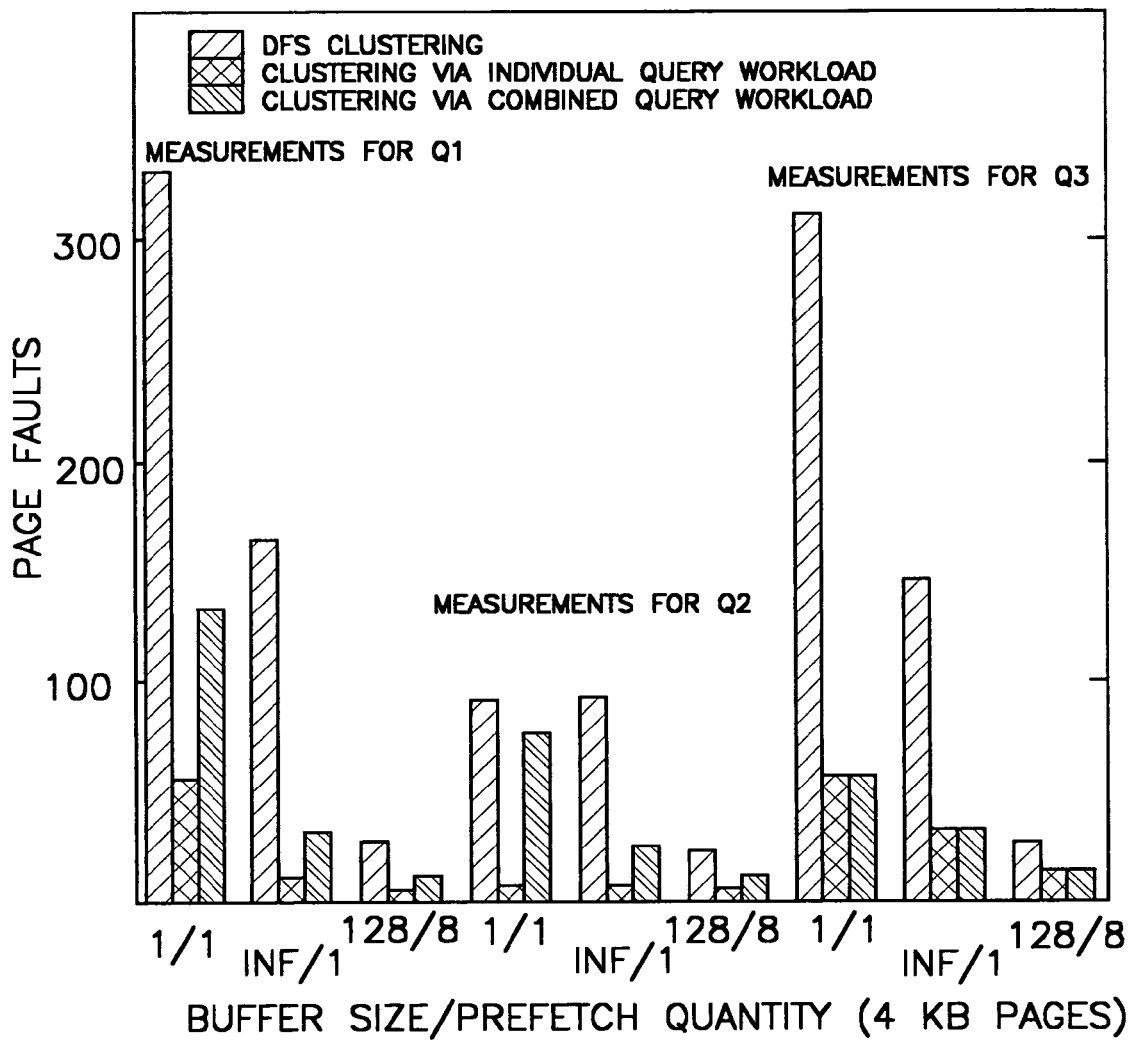
FIG. 4 graphically shows page faults for clustering for various individual query workloads.
Figure 5:
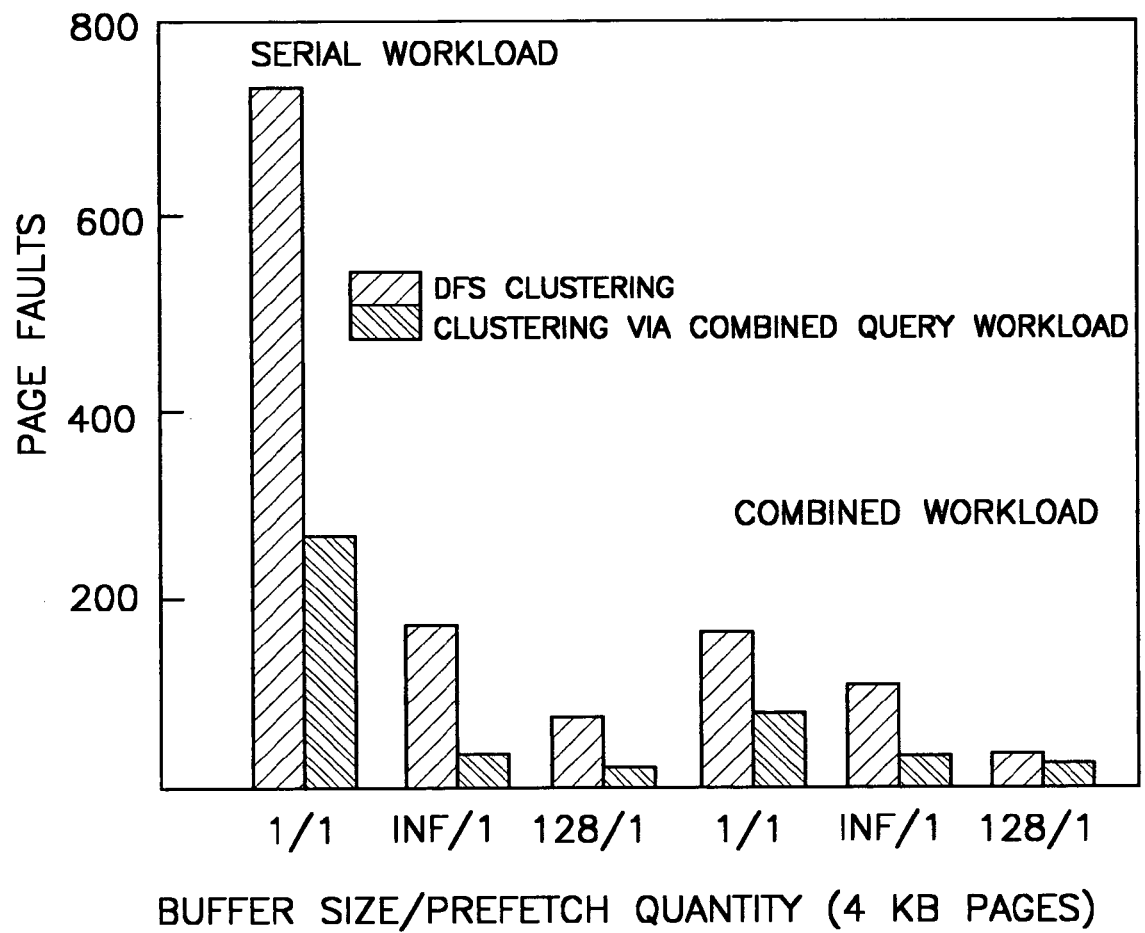
FIG. 5 graphically shows page faults for clustering for various combined query workloads.

FIG. 4 presents the page fault measurements for the individual query workloads and FIG. 5 presents the page fault measurements for the combined query workload in serial and concurrent modes. As demonstrated by the results, in all experiments, XC exhibits a clear advantage over DFS. This confirms the basic tenet that properly modeling run-time usage via edge weights can lead to significant performance advantages. In almost all cases, DFS clustering caused the largest number of page faults. For individual query workloads, the best paging performance for a workload was observed when the document was clustered solely based on the workload query. Only for the third query, Q3, the clustering using the combined query workload was beneficial. Queries 1 and Q3 both traverse the edge province/city, hence the combined query workload generates a clustering that is as good as the one generated by using the workload with 3. Similarly, see FIG. 5, both serial and concurrent executions of the XPath queries benefited from smart clustering. In particular, the serial execution of the combined query workload gains substantially from XCs workload-aware clustering. The results for serial and concurrent cases indicate that XC's ability to exploit local affinities is highly effective in practice. It is worth noting that the DFS partition value was lower than the XC partition value by 10%. Experimental measurements have shown that even a small difference in partition values leads to substantial differences in the paging behavior (FIGS. 4 and 5).

Figure 6:
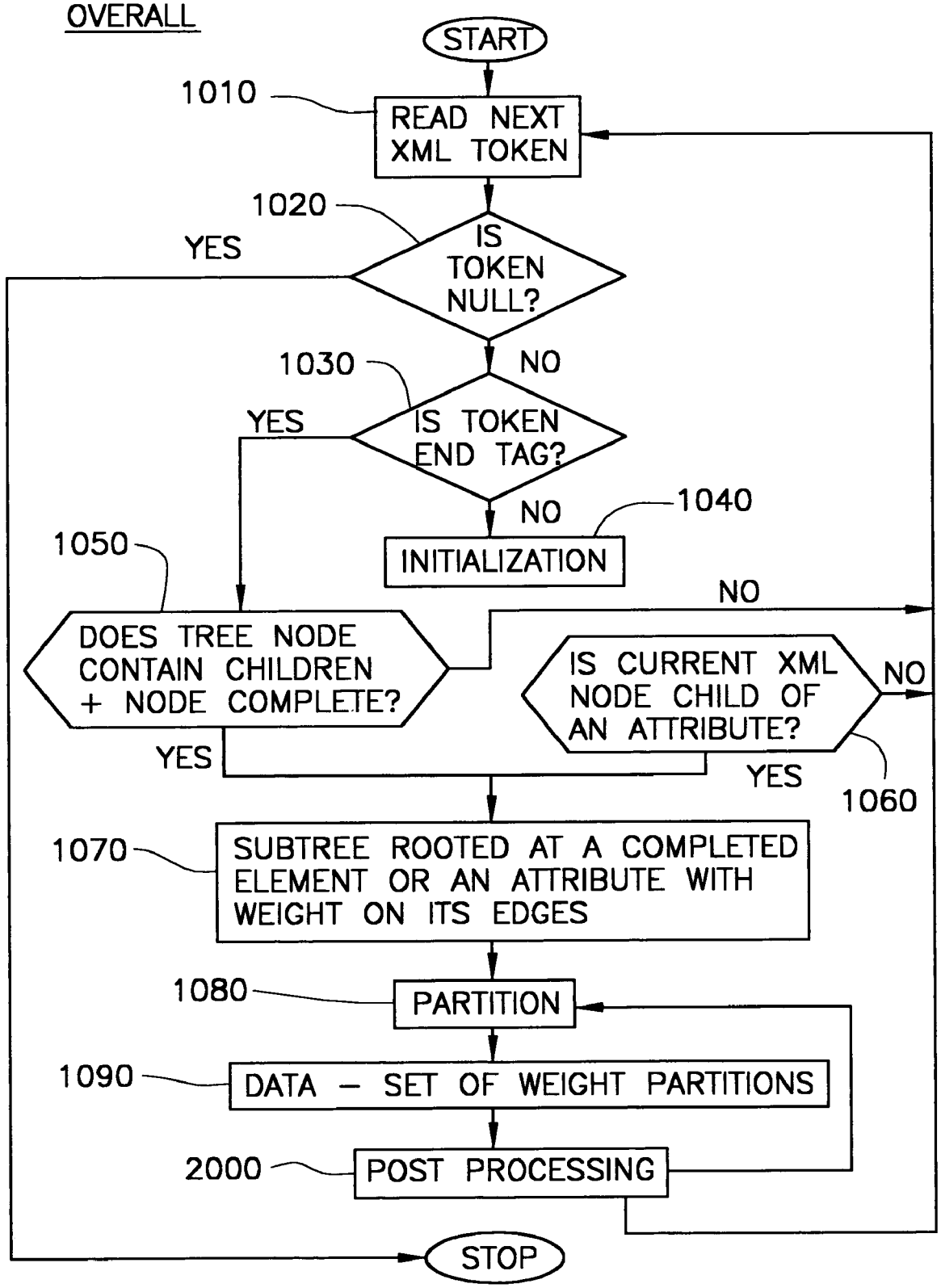
FIG. 6 is a flow chart of the method of the present invention.

Referring now to FIG. 6, a flow chart of a method according to an embodiment of the present invention is shown. At step 1010, the next xml token is read. At decision block 1020, it is determined whether the xml token has a null value. If yes, the no further processing occurs. If not, then it is determined whether the token is the end tag (step 1030). If the token is not the end tag, the token is initialized (step 1040, described in detail below with reference to FIG. 7). After initialization, it is determined whether the token is current xml node child of an attribute, as indicated at decision block 1060. If not, the procedure returns to step 1010. If so, the token is either a subtree rooted at a completed element or an attribute with weights on its edges, as indicated by data block 1070. Returning to step 1030, if the token is an end tag, it is determined whether or not the tree node contains children and if the node is complete, as indicated at decision block 1050. It is also determined at decision block 1060 if the node is a child of an attribute. If the answer to either of these questions is negative, the procedure returns to step 1010. If so, the token is either a subtree rooted at a completed element or an attribute with weights on its edges, as indicated by data block 1070. Data 1070 is then partitioned at step 1080, into a set of W/C partitions, where W is the weight of the partition and C is the chunk size, as indicated by data block 1090. (Step 1080 is described in detail below with reference to FIG. 8). At step 2000, the data is post partition processed, which is described in detail below with reference to FIG. 9. Depending on the results of post partition processing, the next xml token is read (step 1010), or partitioning (step 1080) continues.

Figure 7:
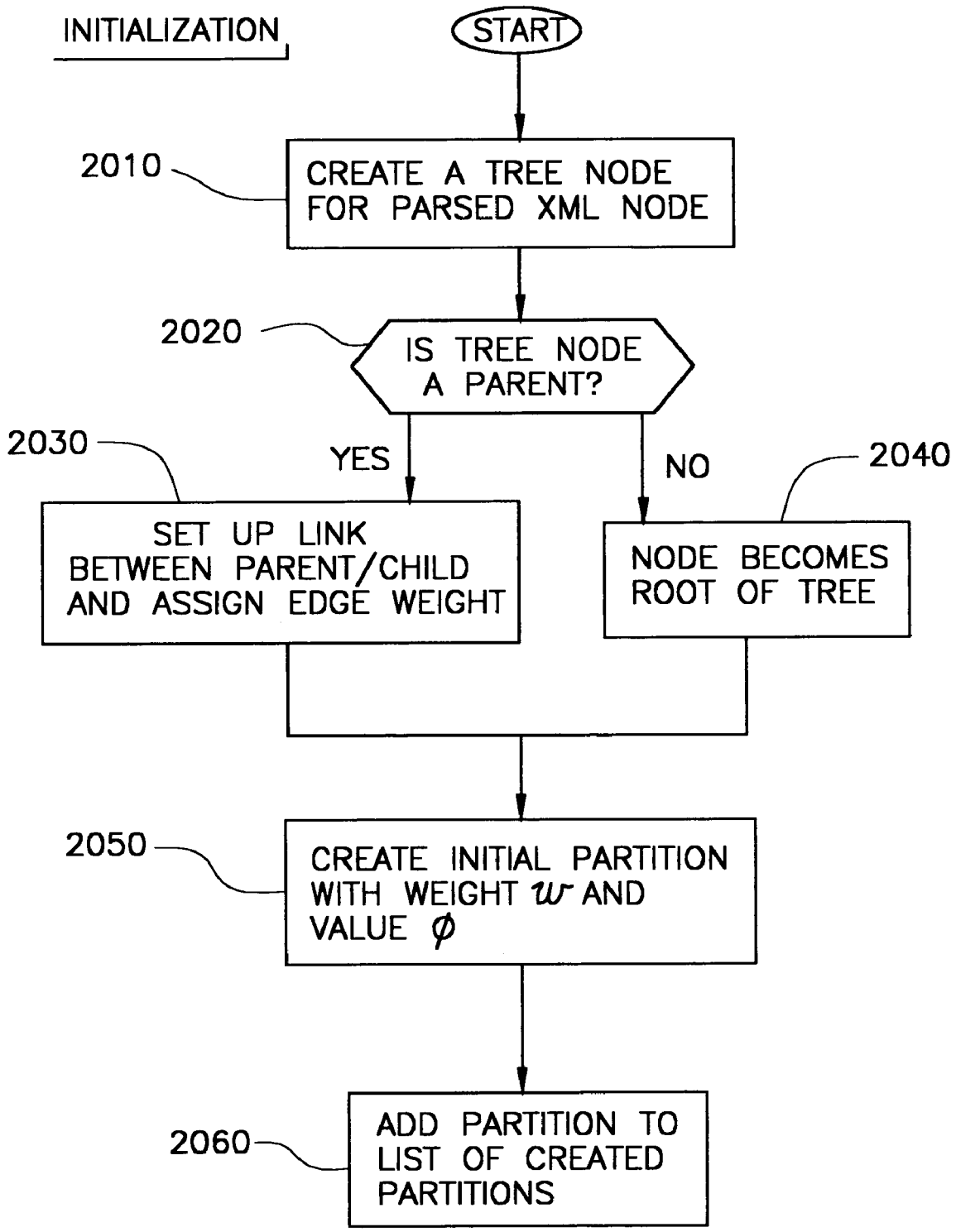
FIG. 7 is a flow chart of the operation of an initialization unit shown in FIG. 6 in accordance with the present invention.

Referring now to FIG. 7, a flow chart of the initialization step of FIG. 6 is shown. At step 2010, a tree node is created for the parsed xml node. It is then determined whether or not the tree node is a parent, as indicated at decision block 2020. If not, the node becomes the root of the tree (step 2040); if yes, a link is set up between the parent and child and edge weights are assigned (step 2030). At step 2050, an initial partition is created having weight Wand value 0. This partition is then added to a list of created partitions (step 2060).

Figure 8:
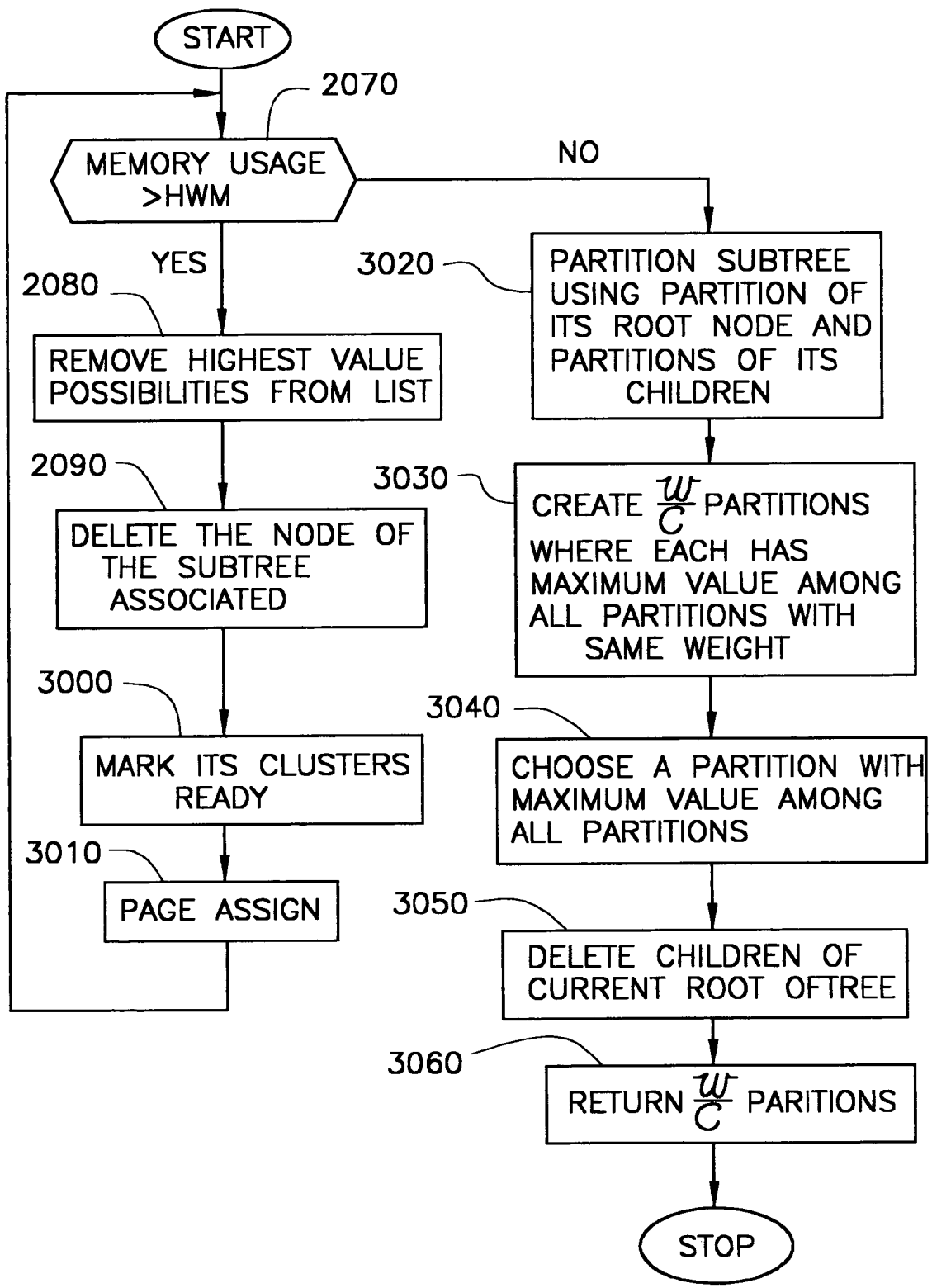
FIG. 8 is a flow chart of a partition unit shown in FIG. 6 in accordance with the present invention.

Referring now to FIG. 8, a flow chart of the partitioning step of FIG. 6 is shown. XC is invoked via a procedure call, on an XML node, during parsing of an XML document within a single pass. XC is invoked every time an XML node is completely scanned (i.e., during endElement ( ), character ( ) SAX events, or when an attribute tag and its value are scanned). Prior to each invocation, say on XML node v, an edge-weight assigner must have assigned a weight to the edge connecting to its XML parent node. XC always works on a node v the set v's children, representing sub-trees which have already been processed by XC. Constant hwm (resp., lwm) are the high (resp., low) water marks which satisfy lwm<hwm<memory_uee_limit.

It is determined if memory usage is greater than hwm, at decision block 2070. If so, the highest value partition P associated with the node of interest is obtained from the list of highest valued partitions (of processed subtrees) and is removed from the list of highest valued partitions (of processed subtrees) (step 2080). The node of the associated subtree is then deleted from the clustering tree (step 2090), and its clusters are marked as ready (step 3000). The clusters are then forwarded to page assignment (step 3010). This continues as long as memory usage is greater than hwm. Once the memory usage is less than hwm, the subtree is partitioned using a partition of its root node and partitions of its children (step 3020). W/C partitions are created where each partition has maximum value among all partitions with the same weight (step 3030). This is done by creating a clustering node x with a weight $w_x$ which equals v's text size; x is then connected to its parent. Partition $P_w$ is then formed with value 0 and weight w, and consists of a single cluster containing node x($P_w$= {(x)}). A partition with the maximum value among all partitions is chosen as an optimal partition (step 3040). If v is a text node (leaf), $P_w$ is marked as the optimal partition for node x. For all other nodes, this partition is marked as an initial partition. Then, the best intermediate partitions rooted at node x with pivot cluster weight w' are computed for $$w' = \frac{w_x}{C}, \ldots, \frac{W}{C},$$

invoking Lukes' method (with ties broken arbitrarily). The (locally) optimized partition $P_{opt}^x$ is identified for the subtree with root x as the intermediate partition with a maximum value among the intermediate partitions associated with node x. Children of the current root of the tree are then deleted (step 3050), and W/C partitions of the tree rooted at node x are then returned (step 3060).

Figure 9:
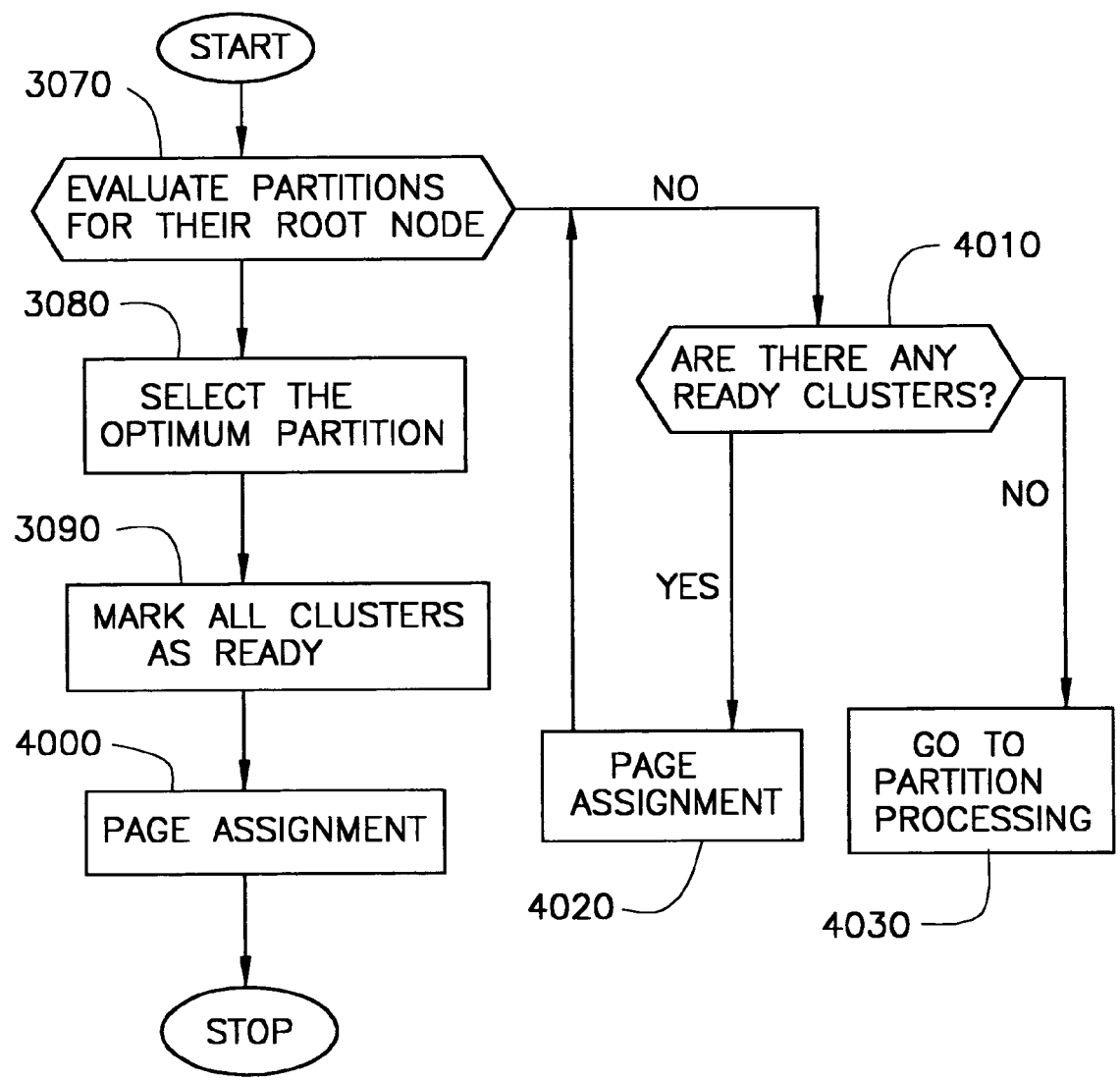
FIG. 9 is a flow chart of a post processing unit shown in FIG. 6 in accordance with the present invention.

Referring now to FIG. 9, a flow chart of the post partitioning step of FIG. 6 is shown. At decision block 3070, each of the W/C partitions for the partitioned subtrees are evaluated to check if they contain the root node of the XML document. If the partitions contain the root node (i.e., they are defined over the entire document), the optimum partition is selected (step 3080) and all of its clusters are marked as ready (step 3090). The ready clusters are then forwarded to page assignment (step 4000). If there is no root node (decision block 3070), at decision block 4010 it is determined whether there are any ready clusters. If not, the process returns to the partitioning step (step 4030). If yes, the ready clusters are forwarded to page assignment (step 4020). This process is repeated as needed, as indicated by decision block 4010.

It is to be understood that the present invention, in accordance with at least one presently preferred embodiment, includes an arrangement for parsing an XML document by node; an arrangement for initializing at least one parsed node; an arrangement for partitioning at least one parsed node; an arrangement for determining XPath work traversals of at least one parsed node; and an arrangement for processing at least one parsed node, which may be implemented on at least one general-purpose computer running suitable software programs. It may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

LIST OF REFERENCES

[W3C] World Wide Web Consortium. W3C Architecture Domain. www.w3c.org/xml. Online Document.

[FK99] D. Florescu and D. Kossmann. Storing and Querying XML Data using an RDBMS. *IEEE Data Engineering Bulletin*, 22(3):27-34, 1999.

[Fre91] G. N. Frederickson. Optimal Algorithms for Tree Partitioning. In *Proceedings of the Second Annual ACM-SIAM Symposium on Discrete Algorithms*, pages 168-177, 1991.

[GJ79] M. S. Garey and D. S. Johnson. *Computers and Intractability*. W. H. Freeman and Co., 1979.

[GKKM93] C. Gerlhof, A. Kemper, C. Kilger, and G. Moerkotte. Partition-Based Clustering in Object Bases: From Theory to Practice. In *Proceedings of the Foundations of Data Organization and Algorithms*, FODO'93, Chicago, Ill., October 13-15, pages 301-316, 1993.

[JN83] D. S. Johnson and K. A. Niemi. On Knapsacks, Partitions, and a New Dynamic Programming Technique for Trees. Mathematics of Operations Research, 8 (1), 1983.

[Ker71] B. W. Kernighan. Optimal Sequential Partitions of Graphs. *J. Assoc. Comp. Mach.*, 18(1):34-40, 1971.

[KM00] C. Kanne and G. Moerkotte. Efficient Storage of XML Data. In *Proceedings of the 16th International Conference on Data Engineering*, San Diego, U.S.A., March 2000. IEEE Computer Society.

[Luk74] J. A. Lukes. Efficient Algorithm for the Partitioning of Trees. IBM Journal of Research and Development, 13(2):163-178, 1974.

[Luk75] J. A. Lukes. Combinatiorial Solution for the Partitioning of General Graphs. *IBM Journal of Research and Development*, 19(2):170-180, 1975.

[Sch77] M. Schkolnick. A Clustering Algorithm for Hierarchical Structures. ACM Transactions on Database Systems (TODS), 2(1):27-44, 1977.

[SWK01] A. R. Schmidt, F. Waas, M. L. Kersten, D. Florescu, M. J. Carey, I. Manolescu, and R. Busse. Why and How to Benchmark XML Databases. *ACM SIGMOD Record*, 3(30), September 2001.

[TD02] F. Tian, D. DeWitt, J. Chen and C. Zhang. The Design and Performance Evaluation of Alternative XML Storage Strategies. In ACM SIGMOD Record, (31):1, pages 5-10, ACM Press, 2002.

[TN91] M. M. Tsangaris and J. F. Naughton. A Stochastic Approach for Clustering in Object Bases. In *Proceedings of the 1991 ACM SIGMOD International Conference on Management of Data, Denver, Colo., May* 29-31, pages 12-21. ACM Press, 1991.

[TN92] M. M. Tsangaris and J. F. Naughton. On the Performance of Object Clustering Techniques. In *Proceedings of the 1992 ACM SIGMOD International Conference on Management of Data, San Diego, Calif., June* 2-5, pages 144-153. ACM Press, 1992.

What is claimed is:

1. A system for clustering XML documents, the system comprising:

an arrangement for parsing an XML document by node;

an arrangement for initializing at least one parsed node;

an arrangement for partitioning at least one parsed node; and an arrangement for processing at least one parsed node;

wherein the system removes XML text data of a node prior to the entire document being clustered by detecting a ready cluster and removing the ready cluster from an intermediate partition upon assignment to a page, wherein said ready cluster is a cluster which carries with it corresponding XML text that would be part of a final partition while avoiding the need to keep the entire XML document in memory until the final partition is computed;

wherein the system utilizes a processor to cluster XML documents;

wherein the system partitions a weight range into equal size weight intervals and associates only one partition for each weight interval;

wherein given a predetermined memory limit M for managing memory usage in selecting optimal partitions, when memory usage reaches a high water mark, a corrective action is triggered to select a ready sub-partition, and when memory usage reaches a low water mark operation resumes;

wherein said ready sub-partition is a highest value partition associated with a root of a processed subtree which is a subset of a computed best partition for a whole clustering tree; and wherein the XML clustering system processes the XML document, partitions the XML document into clusters, and assigns the clusters to pages all within a single pass.

2. The system according to claim 1, wherein the arrangement for initializing at least one parsed node comprises:
   an arrangement for creating at least one tree node for at least one parsed node;
   an arrangement for providing XML workload information about at least one parsed node;
   an arrangement for providing at least one parent/child link and assigning an edge weight when a parsed node is a parent;
   an arrangement for designating a parsed node as the root of a tree when a parsed node is not a parent;
   an arrangement for creating a partition; and
   an arrangement for adding the created partition to a list of created partitions.

3. The system according to claim 2, wherein the arrangement for providing XML workload information comprises:
   an arrangement for analyzing at least one XPath query when at least one node is parsed;
   an arrangement for identifying at least one node that is visited by an XPath query; and
   an arrangement for determining the number of visits to at least one node via the parent/child edge.

4. The system according to claim 2, wherein the arrangement for creating a partition creates an initial partition with node weight w' and value 0.

5. The system according to claim 1, wherein the arrangement for partitioning at least one parsed node comprises:
   an arrangement for partitioning at least one parsed node by making use of a partition of a root node and partitions of at least one child node;
   an arrangement for creating We=W/C partitions, wherein W is a weight bound and further wherein C is a Chunk size;
   an arrangement for selecting a partition with a maximum value from among the Wc partitions; and
   an arrangement for deleting any child nodes of the at least one parsed node.

6. The system according to claim 5, wherein each of the We partitions has maximum value among all partitions with the same weight.

7. The system according to claim 2, wherein the nodes connected by heavier edges are mapped to the same page.

8. The system according to claim 2, wherein system memory is constrained.

9. The system according to claim 2, further comprising an arrangement for identifying at least one ready cluster.

10. A system for clustering XML documents, the system comprising:
    an arrangement for parsing an XML document by node;
    an arrangement for determining XPath work traversals of at least one parsed node;
    an arrangement for clustering at least one parsed node; and
    an arrangement for assigning at least one cluster to a page;
    wherein the system removes XML text data of a node prior to the entire document being clustered by detecting a ready cluster and removing the ready cluster from an intermediate partition upon assignment to a page, wherein said ready cluster is a cluster which carries with it corresponding XML text that would be part of a final partition while avoiding the need to keep the entire XML document in memory until the final partition is computed;
    wherein the system utilizes a processor to cluster XML documents;
    wherein the system partitions a weight range into equal size weight intervals and associates only one partition for each weight interval;
    wherein given a predetermined memory limit M for managing memory usage in selecting optimal partitions, when memory usage reaches a high water mark, a corrective action is triggered to select a ready sub-partition, and when memory usage reaches a low water mark operation resumes;
    wherein said ready sub-partition is a highest value partition associated with a root of a processed subtree which is a subset of a computed best partition for a whole clustering tree; and
    wherein the XML clustering system processes the XML document, partitions the XML document into clusters, and assigns the clusters to pages all within a single pass.

11. The system according to claim 10, wherein the arrangement for parsing at least one parsed node comprises:
    an arrangement for creating at least one tree node for at least one parsed node;
    an arrangement for providing XML workload information about at least one parsed node;
    an arrangement for providing at least one parent/child link and assigning an edge weight when a parsed node is a parent;
    an arrangement for designating a parsed node as the root of a tree when a parsed node is not a parent;
    an arrangement for creating a partition; and
    an arrangement for adding the created partition to a list of created partitions.

12. The system according to claim 11, wherein the arrangement for providing XML workload information comprises:
    an arrangement for analyzing at least one XPath query when at least one node is parsed;
    an arrangement for identifying at least one node that is visited by an XPath query; and
    an arrangement for determining the number of visits to at least one node via the parent/child edge.

13. The system according to claim 11, wherein the arrangement for creating a partition creates an initial partition with node weight w' and value 0.

14. The system according to claim 10, wherein the arrangement for assigning at least one cluster to a page comprises:
    an arrangement for partitioning at least one parsed node by making use of a partition of a root node and partitions of at least one child node;
    an arrangement for creating Wc=W/C partitions, wherein W is a weight bound and further wherein C is a Chunk size;
    an arrangement for selecting a partition with a maximum value among from among the Wc partitions; and
    an arrangement for deleting any child nodes of the at least one parsed node.

15. The system according to claim 14, wherein each of the Wc partitions has maximum value among all partitions with the same weight.

16. The system according to claim 11, wherein the nodes connected by heavier edges are mapped to the same page.

17. The system according to claim 10, wherein system memory is constrained.

18. The system according to claim 10, further comprising an arrangement for identifying at least one ready cluster.

19. A system for clustering an XML document having at least one node, the system comprising:
- an arrangement for assigning an edge weight;
- an arrangement for tree partitioning; and
- an arrangement for page assignment; wherein the system removes XML text data of a node prior to the entire document being clustered by detecting a ready cluster and removing the ready cluster from an intermediate partition upon assignment to a page, wherein said ready cluster is a cluster which carries with it corresponding XML text that would be part of a final partition while avoiding the need to keep the entire XML document in memory until the final partition is computed;
- wherein the system utilizes a processor to cluster an XML document;
- wherein the system partitions a weight range into equal size weight intervals and associates only one partition for each weight interval;
- wherein given a predetermined memory limit M for managing memory usage in selecting optimal partitions, when memory usage reaches a high water mark, a corrective action is triggered to select a ready sub-partition, and when memory usage reaches a low water mark operation resumes;
- wherein said ready sub-partition is a highest value partition associated with a root of a processed subtree which is a subset of a computed best partition for a whole clustering tree; and
- wherein the XML clustering system processes the XML document, partitions the XML document into clusters, and assigns the clusters to pages all within a single pass.

20. The system according to claim 19, wherein system memory is constrained.

21. The system according to claim 19, further comprising an arrangement for identification of at least one ready cluster.

22. A method for clustering XML documents, the method comprising the steps of:
- parsing an XML document by node;
- initializing at least one parsed node;
- partitioning at least one parsed node, wherein a weight range is partitioned into equal size weight intervals and only one partition is associated with each weight interval;
- processing at least one parsed node; and
- wherein XML text data of a node is removed prior to the entire document being clustered by detecting a ready cluster and removing the ready cluster from an intermediate partition upon assignment to a page, wherein said ready cluster is a cluster which carries with it corresponding XML text that would be part of a final partition while avoiding the need to keep the entire XML document in memory until the final partition is computed;
- wherein given a predetermined memory limit M for managing memory usage in selecting optimal partitions, when memory usage reaches a high water mark, a corrective action is triggered to select a ready sub-partition, and when memory usage reaches a low water mark operation resumes;
- wherein said ready sub-partition is a highest value partition associated with a root of a processed subtree which is a subset of a computed best partition for a whole clustering tree; and
- wherein the method for clustering XML documents processes the XML document, partitions the XML document into clusters, and assigns the clusters to pages all within a single pass.

23. The method according to claim 22, wherein initializing the at least one parsed node comprises:
- creating at least one tree node for at least one parsed node;
- providing XML workload information about at least one parsed node;
- providing at least one parent/child link and assigning an edge weight when a parsed node is a parent;
- designating a parsed node as the root of a tree when a parsed node is not a parent; creating a partition; and
- adding the created partition to a list of created partitions.

24. The method according to claim 23, wherein providing XML workload information comprises:
- analyzing at least one XPath query when at least one node is parsed;
- identifying at least one node that is visited by an XPath query; and
- determining the number of visits to at least one node via the parent/child edge.

25. The method according to claim 22, wherein the initial partition is created with node weight w' and value 0.

26. The method according to claim 22, wherein partitioning at least one parsed node comprises:
- partitioning at least one parsed node by making use of a partition of a root node and partitions of at least one child node;
- creating $W_c = W/C$ partitions, wherein W is a weight bound and further wherein C is a Chunk size;
- selecting a partition with a maximum value among from among the Wc partitions; and
- deleting any child nodes of the at least one parsed node.

27. The method according to claim 26, wherein each of the Wc partitions has maximum value among all partitions with the same weight.

28. The method according to claim 23, wherein the nodes connected by heavier edges are mapped to the same page.

29. The system according to claim 22, further comprising identifying at least one ready cluster.

30. A program storage device readable by machine, tangibly embodying a program of instructions executable by the machine to perform method steps for clustering XML documents, said method comprising the steps of:
- parsing an XML document by node;
- initializing at least one parsed node;
- partitioning at least one parsed node, wherein a weight range is partitioned into equal size weight intervals and only one partition is associated with each weight interval; processing at least one parsed node; and
- wherein XML text data of a node is removed prior to the entire document being clustered by detecting a ready cluster and removing the ready cluster from an intermediate partition upon assignment to a page, wherein said ready cluster is a cluster which carries with it corresponding XML text that would be part of a final partition while avoiding the need to keep the entire XML document in memory until the final partition is computed;
- wherein given a predetermined memory limit M for managing memory usage in selecting optimal partitions, when memory usage reaches a high water mark, a corrective action is triggered to select a ready sub-partition, and when memory usage reaches a low water operation resumes;

wherein said ready sub-partition is a highest value partition associated with a root of a processed subtree which is a subset of a computed best partition for a whole clustering tree; and wherein the method for clustering XML documents processes the XML document, partitions the XML document into clusters, and assigns the clusters to pages all within a single pass.

* * * * *